(12) United States Patent
Degrieck et al.

(10) Patent No.: US 9,784,238 B2
(45) Date of Patent: Oct. 10, 2017

(54) WAVE ENERGY CONVERTOR (71) Applicant: UNIVERSITEIT GENT, Ghent (BE)

(72) Inventors: Joris Degrieck, Aalter (BE); Wim Van Paepegem, Zwijnaarde (BE)

(73) Assignee: Universiteit Gent, Ghent (BE)

( * ) Notice: Subject to any disclaimer, the term of this patent is extended or adjusted under 35 U.S.C. 154(b) by 14 days.

(21) Appl. No.: 15/029,549

(22) PCT Filed: Oct. 2, 2014

(86) PCT No.: PCT/EP2014/071180
§ 371 (c)(1),
(2) Date: Apr. 14, 2016

(87) PCT Pub. No.: WO2015/055441
PCT Pub. Date: Apr. 23, 2015

(65) Prior Publication Data
US 2016/0258412 A1    Sep. 8, 2016

(30) Foreign Application Priority Data

Oct. 15, 2013  (EP) ..................... 13188653
Oct. 1, 2014   (WO) ................. PCT/EP2014/071110

(51) Int. Cl.
*F03B 13/10*  (2006.01)
*F03B 13/12*  (2006.01)
(Continued)

(52) U.S. Cl.
CPC .............. *F03B 13/18* (2013.01); *F03B 13/16* (2013.01); *F05B 2260/40311* (2013.01); *F05B 2270/1013* (2013.01); *Y02E 10/38* (2013.01)

(58) Field of Classification Search
USPC .............................. 290/1 C, 43, 53
See application file for complete search history.

(56) References Cited

U.S. PATENT DOCUMENTS 5,823,052 A * 10/1998 Nobumoto .......... F16H 59/0204
                                                      74/335
6,871,128 B2 * 3/2005 Kouno ................ F16H 61/6648
                                                      192/3.51
(Continued)

FOREIGN PATENT DOCUMENTS

EP        0120654 A1    10/1984
WO   2006118482 A1    11/2006
(Continued)

OTHER PUBLICATIONS

Extended European Search Report for corresponding European Application 13188653.3, Mar. 31, 2014.
(Continued)

*Primary Examiner* — Pedro J Cuevas
(74) *Attorney, Agent, or Firm* — Workman Nydegger (57) ABSTRACT

A device and method for generating electric energy from a wave motion are described. The device comprises a drive train with a power split transmission comprising at least three ports. The drive train is arranged between a movable element and a main electric generator. The device further comprises a variable speed auxiliary electrical machine connected to one of the ports and a control unit for controlling the auxiliary electrical machine. The control unit is adapted for controlling the power distribution in the power split transmission as to realize a one-way rotation of the main electric generator.

12 Claims, 9 Drawing Sheets

(51) Int. Cl.
*H02P 9/04* (2006.01)
*F03B 13/18* (2006.01)
*F03B 13/16* (2006.01)
*F02B 63/04* (2006.01)

(56) References Cited

U.S. PATENT DOCUMENTS

| | | | |
|---|---|---|---|
| 7,115,066 B1 * | 10/2006 | Lee | F16H 3/727 |
| | | | 475/153 |
| H2188 H * | 5/2007 | Leithead | F16H 33/10 |
| | | | 74/15.66 |
| 7,462,124 B2 * | 12/2008 | Han | F16H 3/721 |
| | | | 475/270 |
| 7,914,411 B2 * | 3/2011 | Basteck | F03D 15/00 |
| | | | 475/35 |
| 8,388,481 B2 * | 3/2013 | Han | H02P 9/04 |
| | | | 180/364 |
| 9,476,401 B2 * | 10/2016 | Han | F03B 13/264 |
| 2002/0173403 A1 * | 11/2002 | Kohno | F16H 61/6648 |
| | | | 477/37 |
| 2006/0205553 A1 * | 9/2006 | Lee | F16H 3/727 |
| | | | 475/5 |
| 2007/0007769 A1 * | 1/2007 | Basteck | F03D 15/00 |
| | | | 290/1 C |
| 2012/0115662 A1 * | 5/2012 | Han | H02P 9/04 |
| | | | 475/31 |
| 2016/0010620 A1 * | 1/2016 | Han | F03B 13/264 |
| | | | 290/43 |
| 2017/0030326 A1 * | 2/2017 | Han | F03D 3/002 |
| 2017/0047820 A1 * | 2/2017 | Degriek | H02K 7/1853 |

FOREIGN PATENT DOCUMENTS

| | | |
|---|---|---|
| WO | 2007042847 A1 | 4/2007 |
| WO | 2011092555 A2 | 8/2011 |
| WO | 2011126451 A1 | 10/2011 |

OTHER PUBLICATIONS

International Search Report for corresponding International PCT Application PCT/EP2014/071180, Feb. 13, 2015.

Vantorre et al., "Modelling of Hydraulic Performance and Wave Energy Extraction by a Point Absorber in Heave," Applied Ocean Research, Sep. 28, 2004, pp. 61-72, vol. 26.

* cited by examiner

WAVE ENERGY CONVERTOR

FIELD OF THE INVENTION

The present invention relates to methods and systems for generating electric energy from wave motion. The present invention relates to methods and systems for converting a bidirectional movement caused by environmentally induced motion into a unidirectional rotary movement.

BACKGROUND OF THE INVENTION

Wave energy has a large potential to become an interesting and important cost efficient source of electrical power due to the high energy density of waves in the ocean. Furthermore, it is believed that wave energy is more predictable and more consistently available than wind power. The wave energy is captured by means of a wave energy converter (WEC).

A wave energy converter as used in this application is defined as a system for converting wave energy into electrical energy.

A number of different types of wave energy converters exist which are categorized based on their size, required water depth, working principle, . . . . Based on the method used to capture the energy of the waves, one may for instance distinguish between point absorbers or buoys, attenuators, terminator devices, oscillating water column devices and overtopping devices.

A wave energy converter comprises an element which is movable under the influence of the wave motion. A wave-induced movement of the buoy, or of the movable element in general, typically is a bidirectional movement or oscillatory movement or pendular movement, causing a mechanical shaft connected to the movable element to rotate alternatively in positive and negative direction. This mechanical shaft is then further connected to the rotor of an electrical machine operating as an electric generator. As such the mechanical energy can be transformed into electrical energy. The part of the WEC being responsible for transforming absorbed wave energy into electrical energy is typically referred to as the power-take-off (PTO) system of a WEC.

Efficiently transforming the energy comprised in the pendular or oscillatory movements of the movable element into electrical energy is hard. Indeed, such oscillatory movements cause the rotor of the electric generator to undergo a bidirectional rotational movement, i.e. to consecutively come to stand-still, to accelerate to a maximum rotation speed in a first direction, to decelerate and to come to stand-still once more, to accelerate to a maximum rotation speed in a second direction, opposite the first direction, to decelerate and to come to stand-still once more. As a consequence the control of such a machine becomes quite difficult on the one hand and on the other hand the electrical machine operates in conditions of torque and speed which are far off the nominal and optimal operating points.

Therefore, there have been several attempts to transform the oscillatory movement of the movable element in a unidirectional movement of the rotor of the generator. Such attempts include the use of special types of gearboxes such as planetary gearboxes as presented in e.g. WO2011/126451, WO2006/118482, WO2011/092555. All these examples use at least one, typically two clutches, freewheels or other anti-reverse mechanisms. Such clutches, freewheels and anti-reverse mechanisms are then continuously engaged and disengaged to ensure the wave-induced oscillatory movement is converted and inverted to realize a unidirectional movement of the rotor of the generator. However, the continuous engagement and disengagement of such freewheels or anti-reverse mechanisms cause mechanical losses in the PTO system as well does it cause the wave energy converter's PTO system to be prone to mechanical wear reducing its lifetime. Therefore, there is still a need for more efficient and/or more robust PTO systems.

SUMMARY OF THE INVENTION

It is an object of embodiments of the present invention to provide a device and method for generating electric energy from a wave motion in an efficient way. It is an advantage of embodiments of the present invention that electric energy can be generated from wave motion in a more efficient way than conventional prior art systems.

The above objective is accomplished by a device and method according to the present invention.

In a first aspect, the present invention relates to a device for generating electric energy from a wave motion. The device comprises a movable element movable under the influence of the wave motion, a main electric generator and a drive train comprising an input branch and an output branch. The drive train is arranged between the movable element and the main electric generator. The movable element imposes an oscillatory movement on the input branch of the drive train as a result of the wave motion. The oscillatory movement thereby typically is a periodic movement, having a period wherein during alternating moments in time positive and negative speeds are imposed to the input branch. The drive train comprises a power split transmission comprising at least three ports, the at least three ports comprising at least one input port connected to the input branch, at least one output port connected to the output branch and at least one control port. The power split transmission is arranged for distributing power on the input port to the at least one output port and the at least one control port. The drive train furthermore comprises a variable speed auxiliary electrical machine and a control unit for controlling the auxiliary electrical machine. The at least one control port of the power split transmission is connected to the auxiliary electrical machine and the control unit is adapted for controlling power distribution in the power split transmission as to realize a one-way rotation of the main electric generator during the whole period of the oscillatory movement.

It is an advantage of embodiments of the present invention that a wave motion which is a movement in substantially two different directions, e.g. a substantially upward and substantially downward movement, is efficiently transferred to a one directional rotational movement, e.g. without the need for continuously coupling and decoupling clutches.

The control unit may be configured for controlling power distribution of a positive power flow from the moveable element to the drive train in one part of a period of the oscillatory movement and of a negative power flow from the moveable element to the drive train in another part of the period of the oscillatory movement.

The control unit may be configured for controlling an auxiliary torque or an auxiliary acceleration of the auxiliary electrical machine for controlling power distribution to and from any of the at least three ports of the power split transmission.

The control unit may be configured for controlling using the control port the torque and/or acceleration of the input port or the output port.

The control unit may be configured for controlling for example the input port in such a way that a maximal energy can be converted from the wave motion, resulting in a given amount of power that is obtained at the output port.

The control unit may be configured for performing said power distribution to and from any of the at least three ports of the power split transmission so as to shift the moments in time of imposing positive and negative speeds at the input branch with respect to the moments in time when positive or negative power flow from the movable element to the drive train occurs.

The control unit may be configured for realising a predetermined torque of the movable element as to extract the maximum amount of energy during the period of the oscillatory movement.

In embodiments according to the present invention, the angular velocity of the main electric generator can be predetermined.

In embodiments according to the present invention, the angular velocity of the main electric generator can be substantially constant over one period of the oscillatory movement.

In embodiments according to the present invention, the control unit can be adapted for controlling an auxiliary torque or an auxiliary acceleration of the auxiliary electrical machine in such a way that a predetermined torque of the movable element is realised.

In embodiments of the present invention, the predetermined torque of the movable element can be chosen such that the extracted electric energy is maximal.

In embodiments of the present invention, the power split transmission can comprise a planetary gear box comprising a sun gear, a ring gear and a planet gear.

In embodiments of the present invention, the power split transmission can comprise a differential unit.

In some embodiments, the output branch can have a natural, inherent mechanical moment of inertia due to the axis and rotor configuration, so that the main generator can store kinetic energy from the system at certain moments in time.

The output branch may comprise at least a mechanical energy storage device to increase the moment of inertia, the storage device adapted for storing at some moments in time mechanical power and for providing at certain moments in time mechanical power to the main generator.

The mechanical energy storage device may be a flywheel.

The at least three ports of the power split transmission may consist of one input, one output and one control port and the control unit may be configured for extracting power from the movable element during movement of this element in one direction.

The at least three ports of the power split transmission may comprise at least one input port, at least one output port and at least one control port.

The at least three ports of the power split transmission may comprise one input, one output and at least two control ports and wherein the control unit may be configured for extracting power from the movable element during movement of this element in substantially two different directions (e.g. left rotating—right rotating, left—right, upward—downward). The two different directions may be a substantially upward and a substantially downward direction.

In a second aspect, the present invention relates to a method for generating electric energy from a wave motion, the method comprising providing interaction between a wave motion and a movable element, the moveable element thus imposing an oscillatory movement being a periodic movement to an input branch of a power split transmission, the periodic movement having a period wherein during alternating moments in time positive and negative speeds are imposed to the input branch, controlling a power distribution in a power split transmission arranged between the movable element and a main electric generator as to realize a one-way rotation of the main electric generator, the controlling power distribution comprises controlling a variable speed auxiliary electrical machine connected to the power split transmission.

It is an advantage of embodiments of the present invention that the conversion of the wave energy in electric energy can be realized with a drive train without freewheels or anti-reverse mechanisms.

It is an advantage of embodiments of the present invention that a more efficient device and method for generating electric energy from a wave motion can be realized.

It is an advantage of embodiments of the present invention that a device and method for generating electric energy from a wave motion can be provided in which the need for wear-sensitive components can be substantially reduced.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter. The drawings are only schematic and are non-limiting. In the drawings, the size of some of the elements may be exaggerated and not drawn on scale for illustrative purposes.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

It is to be noticed that the term "a first element connected to a second element", should be interpreted as the first element being directly connected to the second element or the first element being indirectly connected to the second element, the latter meaning that additional components can be part of this connection.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Where in the present description reference is made to the main generator, it is meant the electrical machine that converts the mean (average) power extracted from the waves into electrical energy, the main generator being connected to the output branch of the drive train.

Wherein in the present invention reference is made to an auxiliary electrical machine, it is meant the electrical machine that during one period of the oscillatory movement acts both as a generator and as a motor as to control the power flow on the control port of the power split transmission it is connected to.

Where in the present invention reference is made to a speed or torque of the main electric generator as being "substantially constant", reference is made explicitly to the variation in speed or torque over one period of the oscillatory movement of the movable element, this variation being below 25%, preferably below 15% of the rated speed or torque. It should be noted that this does not mean that over several periods of the oscillatory movement the speed—in fact mainly the torque—may change to a larger extend. These changes in torque or speed over several periods of the oscillatory movement are coupled to the main power delivered to the main generator as extracted by the movable element which depends on the sea state conditions.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. The invention will be further described for point absorber devices, but can in principle be used for any type of wave energy converter considered suitable by the person skilled in the art. FIGS. 1, 2, 3, 4 and 5 all show conceptual diagrams of point absorber wave energy converters, in such converters energy is extracted from the waves by allowing a movable element to move in relation to a fixed reference point.

The device according to an embodiment of the present invention comprises an element movable under the influence of the wave motion. The movable element of the device may comprise a floating structure, such as for instance a buoy, floater or pontoon, which is moving as a result of the wave motion.

The device according to an embodiment of the present invention further comprises a main electric generator.

The device according to an embodiment of the present invention further comprises a drive train comprising an input and an output branch arranged between the movable element and the main electric generator. The movable element is connected to the input branch of the drive train and imposes an oscillatory movement on the input branch of the drive train as a result of the wave motion. The main electric generator is with one end connected to an electrical grid or to electrical storage components, and with another end connected to the output branch of the drive train of the device according to the present invention.

The movable element and the oscillatory movement may be realised in any manner considered suitable by the person skilled in the art. Some examples are given hereunder, without the invention being limited thereto.

Figure 1:
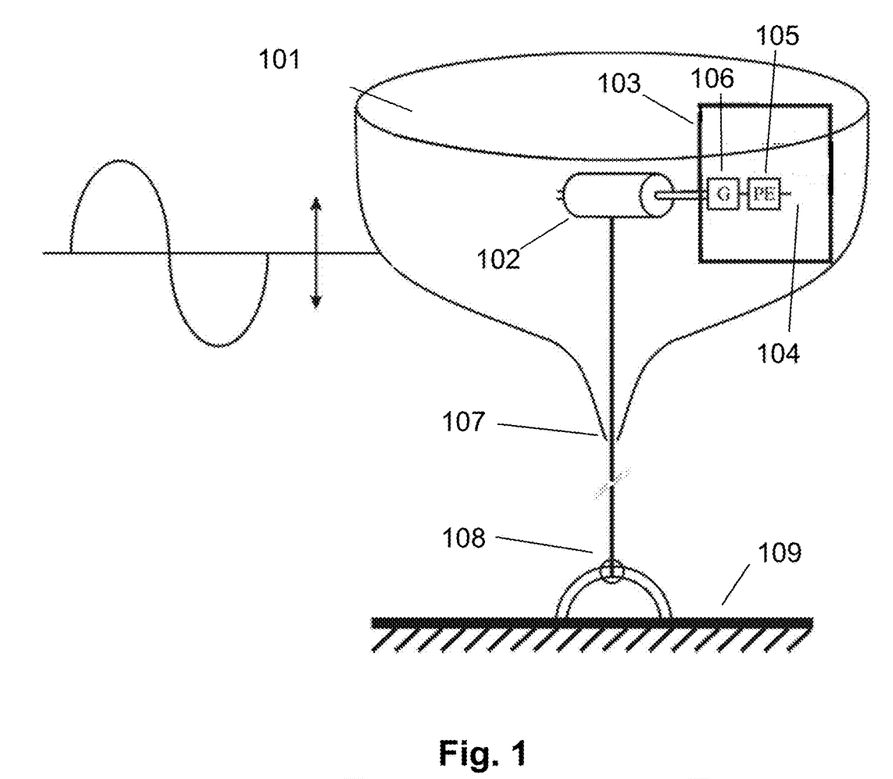
FIG. 1 shows a conceptual diagram of a wave energy converter of the point absorber type resulting in an oscillatory movement that can be transformed by embodiments of the present invention.

In FIG. 1 the movable element is a buoy. The buoy shown in FIG. 1 is fully closed, with the exception of at least one hole. The at least one hole allows the exit of a main cable. One end of the main cable is attached to an external reference point, for instance an anchor on the bottom of the sea as shown in FIG. 1. As shown in FIG. 1, the main cable may be guided towards the hole of the buoy through a guiding rod to reduce friction, heating of the main cable and hence extending the life time of the overall device. Inside the buoy, the main cable may then be connected to a drum onto which the cable is winded up and off following the buoy movement. The translation movement of the buoy is as such translated into an oscillatory rotational movement of the drum to which the movable element is connected.

Figure 2A:
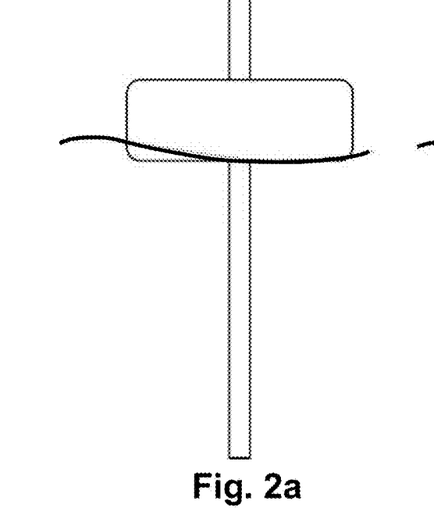
FIG. 2a and FIG. 2b show second conceptual diagrams of a wave energy converter of the point absorber type resulting in an oscillatory movement that can be transformed by embodiments of the present invention.
Figure 2B:
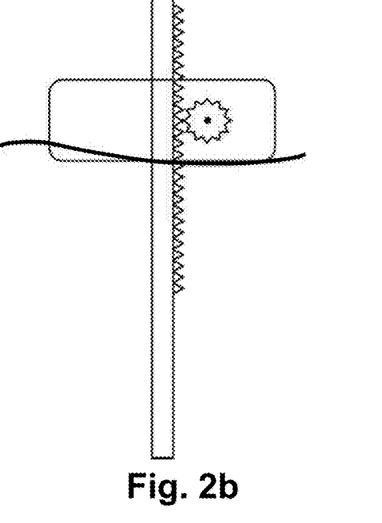

In the devices shown in FIG. 2a and FIG. 2b the oscillatory movement is realised in the following way. In FIG. 2a and FIG. 2b, the movable element is once more a buoy, moving up and down with respect to a spar. This spar can be a mono-pile that has been piled into the seabed or it can be a floating structure with an appropriate shape and weight to create a spar that remains at a merely fixed position. Inside the buoy a pinion gear rotates due to the vertical movement of the buoy in relation to a rack on the spar. The movement of this pinion gear will be a oscillatory movement.

Figure 3:
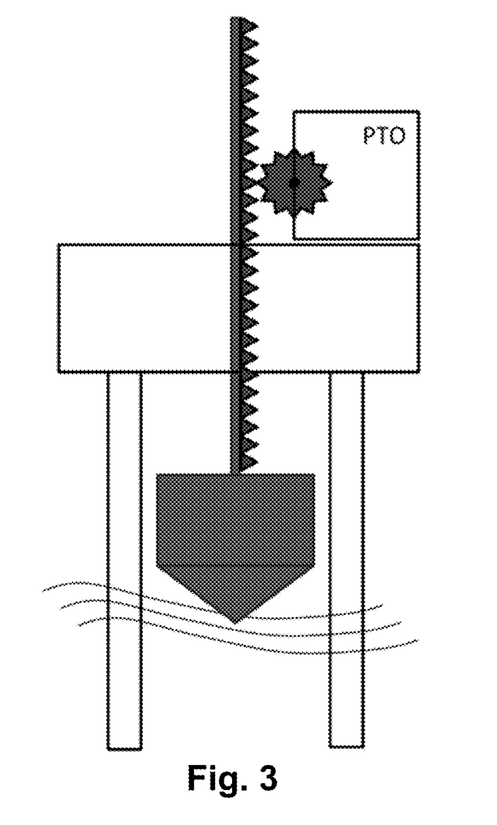
FIG. 3 shows a third conceptual diagram of a wave energy converter of the point absorber type resulting in an oscillatory movement that can be transformed by embodiments of the present invention.

In the device shown in FIG. 3 the oscillatory movement is realised in the following way. In FIG. 3 a fixed platform is created to realise a fixed point of reference. The movable element is once more a buoy with a rack extension. The waves cause the buoy to move up and down resulting in a rotation of the pinion gear located on the fixed platform, the movement of this pinion gear will be an oscillatory movement.

Figure 4:
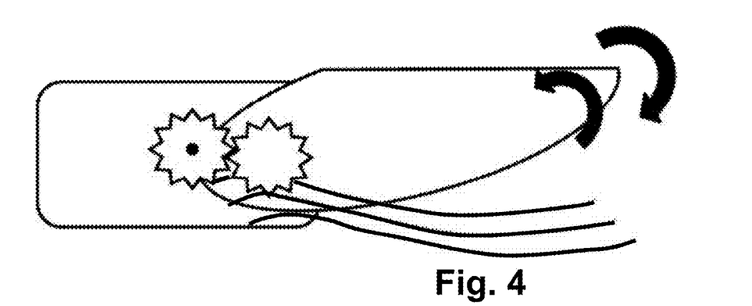
FIG. 4 shows a fourth conceptual diagram of a wave energy converter of the point absorber type, known as the Salter Duck, resulting in an oscillatory movement that can be transformed by embodiments of the present invention.

In the device shown in FIG. 4 the oscillatory movement is realised in the following way. FIG. 4 shows a near-shore device whereby a dike is the fixed reference point. The movable element is a buoy that is able to rotate along an axis. The rotation of the buoy is transferred via an appropriate gear to a rotation of a gear on the dike. The movement of this latter gear will be a oscillatory movement.

Figure 5A:
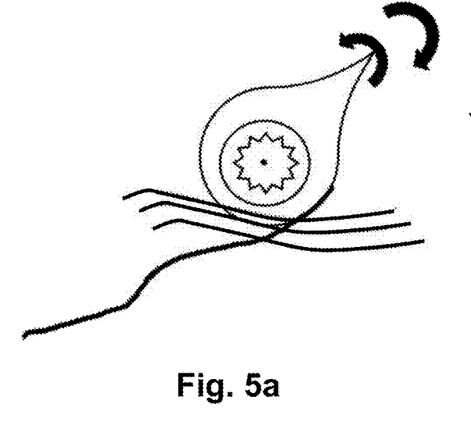
FIG. 5a and FIG. 5b show respectively a fifth and sixth conceptual diagram of a wave energy converter of the point absorber type, resulting in an oscillatory movement that can be transformed by embodiments of the present invention.
Figure 5B:
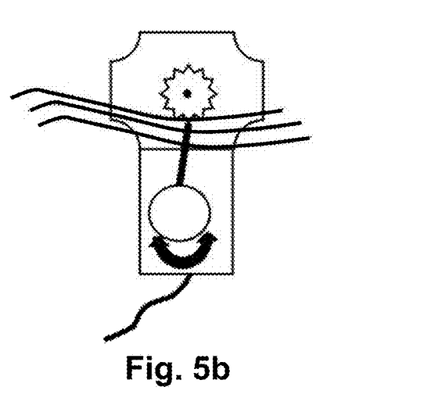

In the devices shown in FIG. 5a and FIG. 5b the oscillatory movement is realised in the following way. The devices comprise a floater which is pitching due to the wave motions. Inside the floater an internal mass with an appropriate inertia causes a relative movement between this internal mass and the floater. In FIG. 5a the centre of mass of the internal mass coincides with the centre of rotation, while in FIG. 5b the centre of mass of the internal mass does not coincide thereby creating a pendulum.

Figure 11:
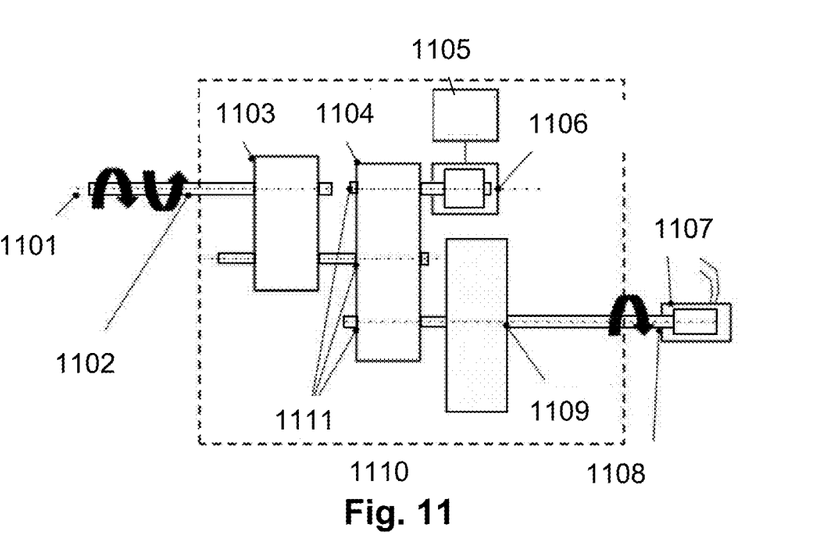
FIG. 11 shows a device according to an embodiment of the present invention comprising a power split transmission, whereby in this case a planetary gear box is used of which the ring gear is connected to an auxiliary generator, the sun gear is connected to a movable element and the planetary gear is connected to a main generator.

A possible implementation of the drive train according to embodiments of the present invention is shown in FIG. 11. FIG. 11 shows the input branch of the drive train being operably connected to the movable element and the output branch of the drive train being operably connected to the main generator. FIG. 11 further shows a drive train comprising a power sharing transmission with three ports.

According to embodiments of the present invention, the movable element imposes an oscillatory movement on the input branch of the drive train as a result of the wave motion. The oscillatory movement thereby typically is a periodic movement having a period wherein during alternating moments in time of the period a positive and negative speed is imposed to the input branch, e.g. to a rotatable axis of the input branch. Due to the nature of wave energy the period of this periodic movement will vary over time, depending on the local wave climate and the existing wave state conditions. Typical periods are in the order of 1 to 10 up to even 15 seconds. The moment in time of positive and negative speeds are hence in the order of 0.5 s to 5 up to even 7.5 seconds.

Figure 7:
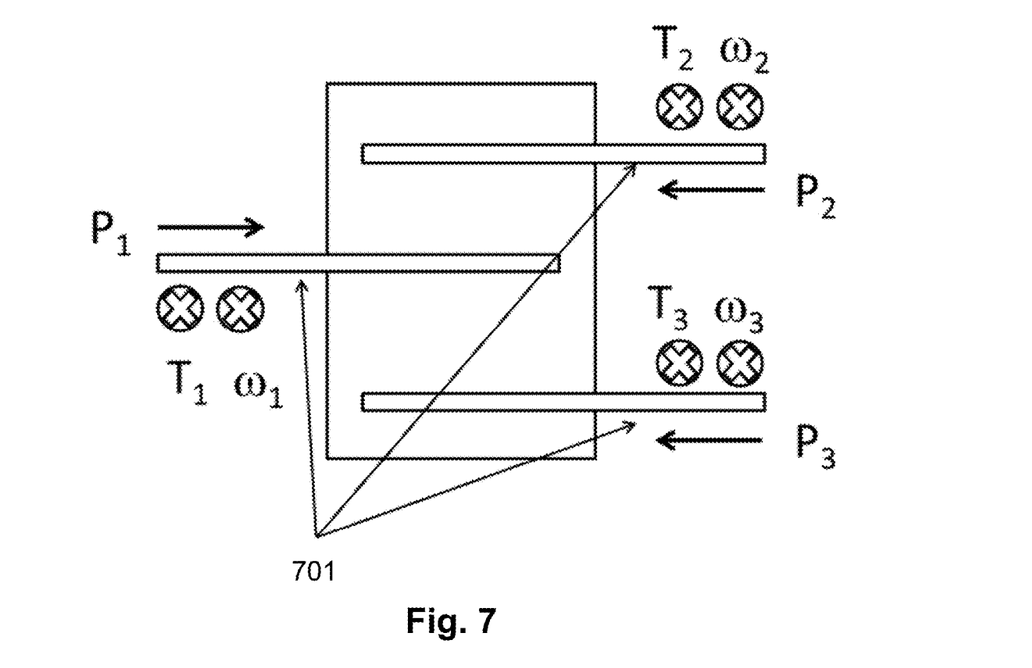
FIG. 7 shows an exemplary embodiment of a device according to the present invention, the device comprising a power split transmission comprising at least three ports, the positive direction of the power flows at each of the ports, as well as the positive direction of the torque and angular speed at each of the ports (using the general engineering notation) being shown.

The drive train of the device according to an embodiment of the present invention further comprises a power sharing transmission or power split transmission. Where in the present invention reference is made to a power sharing transmission or power split transmission, it is meant a device that has N input/output ports (N being at least three) whereby the sum of the power flows ($P_i$) on each of these ports equals zero, or:

$$\sum_{i=1}^{N} P_i = 0$$

whereby each of the power flows $P_i$ is directed towards the device as for instance shown in FIG. 7 showing the reference directions of torque and angular speed. In this equation internal friction and inertia of the power sharing transmission are not yet included (see below).

It should be noted that each of the three ports of the power split transmission can be considered as an input or output depending on the application, the specific moment in time, . . . . During operation a port may for instance operate as an input port in the sense that it injects power into the power split transmission, while moments later that same port can extract power from the power sharing transmission at which moment in time it could be perceived as an output port.

In drive trains comprising a power split transmission according to the present invention, i.e. drive trains that are used to convert wave energy, the port of the power split transmission connected to the input branch would typically be perceived as an input port, the port of the power split transmission connected to the main generator would typically be perceived as an output port. The at least third port of the power split transmission could be perceived as a control port(s).

The drive train according to the present invention further comprises at least one auxiliary electrical machine connected to the at least one control port of the power split transmission. The auxiliary electrical machine typically may be a variable speed auxiliary machine. The power split transmission in the drive train of the present invention is arranged for distributing power on the input port to the at least one output port and the at least one control port. The distribution of power may be done in such a way that the oscillatory movement imposed on the input branch of the drive train caused by the wave movement is converted in a one-way rotation of a rotor of the main electrical generator connected to the output branch. This may be realized by suitably controlling the power flow on the control port of the power split transmission with the aid of the auxiliary electrical machine and a control unit for controlling the auxiliary electrical generator as will be explained further.

Figure 6A:
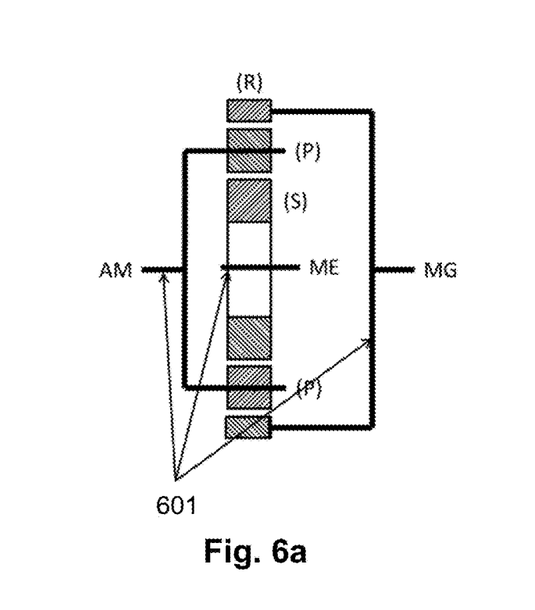
FIG. 6a and FIG. 6b show two exemplary embodiments of a device according to the present invention, the device comprising a planetary gear box.
Figure 6B:
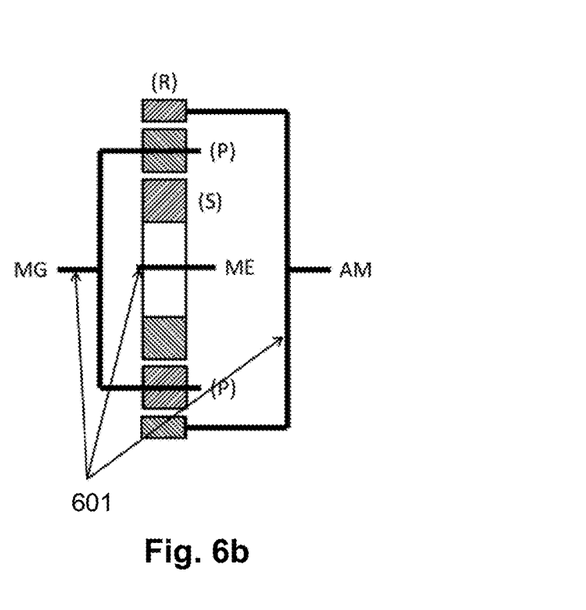

The power sharing transmission or power split transmission may comprise a planetary gearbox, wherein the number of ports is 3, such as shown in FIG. 6a and FIG. 6b. Such a gearbox typically comprises a sun gear, a ring gear and planet gears, which are also sometimes referred to as sun wheel (S), ring wheel (R) and planet wheel (P). In the embodiment shown in FIG. 6b, the sun gear (S) is connected to the movable element (ME) showing the wave-induced oscillatory movement. The ring gear (R) is connected to an auxiliary electrical machine (AM) and the planet gear (P) is connected to the main electrical generator (MG). In the embodiment shown in FIG. 6a, the sun gear (S) is connected to the movable element (ME), the planet gear (P) is connected to an auxiliary electrical machine (AM) and the ring gear (R) is connected to the main electrical generator (MG).

Figure 6C:
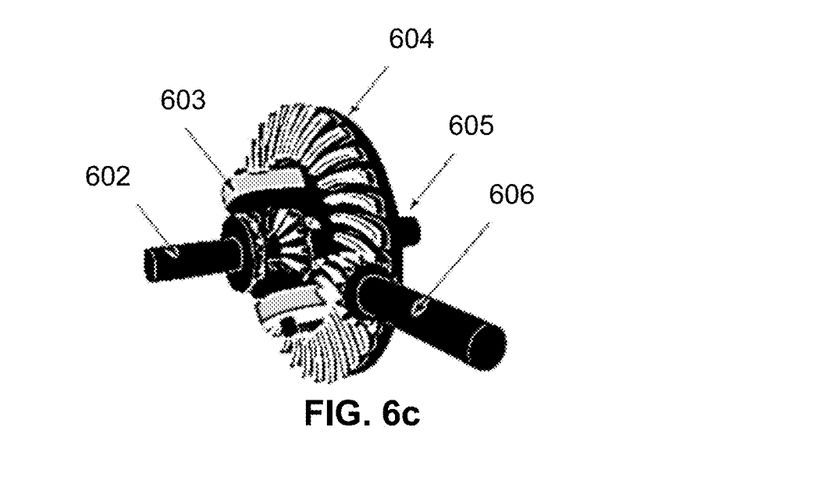
In FIG. 6c an example of a power split transmission comprising a differential is shown.

The power sharing transmission or power split transmission may comprise a differential, wherein the number of ports is 3, such as shown in FIG. 6c. Such a gearbox typically comprises a pinion gear, a ring gear which is coupled via a differential to a left and right axle. Through such a system the power is split over the two axles. The movable element in such a system could be connected preferably to the pinion gear, the auxiliary electrical machine to either the right or left axle and the main electrical generator to the other axle.

The power sharing transmission can also comprise a combination of one or more coupled planetary gearboxes or differentials as to generate a system with more than 3 ports; e.g. a combination of two differentials.

Figure 8:
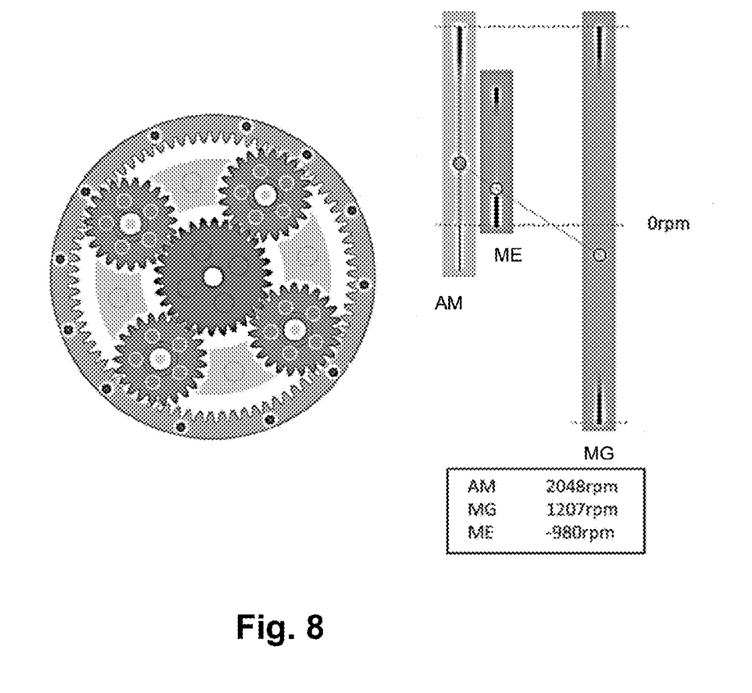
FIG. 8 shows the speed conditions of a device according to an embodiment of the present invention at each of the ports in case the drum speed is negative.
Figure 9:
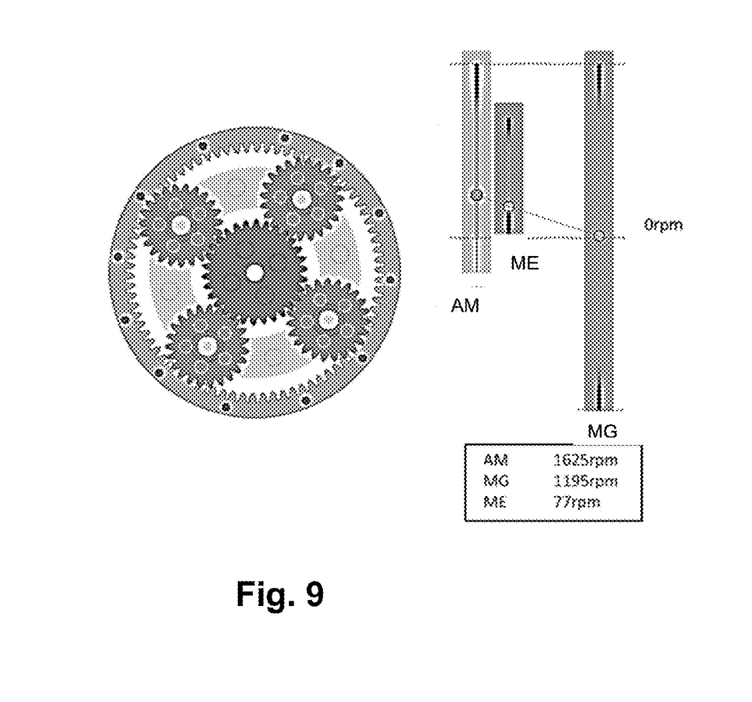
FIG. 9 shows the speed conditions of a device according to an embodiment of the present invention at each of the ports in case the drum speed is close to zero.
Figure 10:
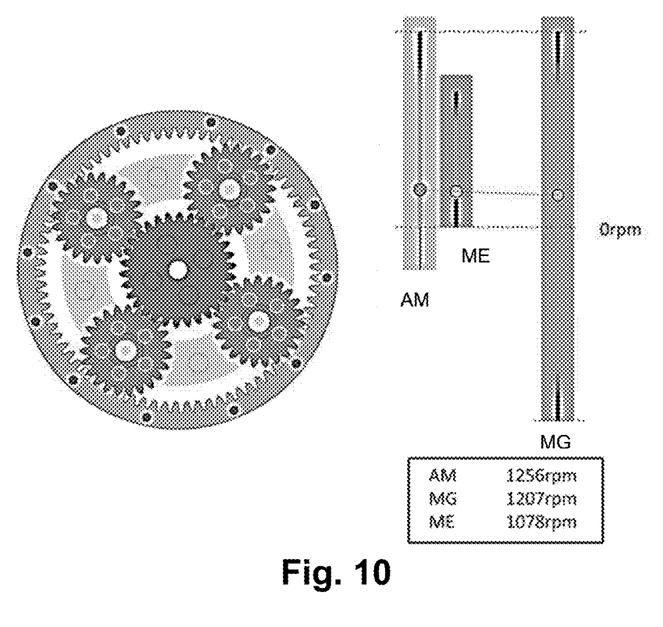
FIG. 10 shows the speed conditions of a device according to an embodiment of the present invention at each of the ports in case the drum speed is positive.

FIGS. 8, 9 and 10 show the rotation speeds of the movable element, a rotor of the auxiliary electrical machine and a rotor of the main generator for a device according to an embodiment of the present invention as shown in FIG. 6a, during several stages of the oscillatory movement. As can be seen, the device according to the present invention may result in a one-way rotation of the rotor of the main generator.

FIG. 8 shows the situation wherein the speed of the movable element is negative, i.e. moving as to cause a rotation in a first direction (negative, counter clockwise), while the other two shafts are running in another direction (positive, clockwise). The rotation speed of the main generator is in this case e.g. approximately 1200 rpm, the speed of the auxiliary machine is about 2000 rpm and the speed of the movable element is about −1000 rpm. It is noted that rpm stands for rotations per minute. This can be converted to angular velocity ($\omega$) using the following formula, 1 rpm=$2\pi c/60$ rad/s.

FIG. 9 shows the situation wherein the speed of the movable element is decreased and reaches 0 rpm, the speed of the main generator remains approximately 1200 rpm, while the speed of the auxiliary machine has reduced as well to about 1600 rpm. After this point the movable element will start to show an increase in speed once more to reach its final maximum positive speed.

FIG. 10 shows the situation wherein the speed of the movable element is positive, i.e. moving as to cause a rotation in a second direction, opposite the first direction. In FIG. 10 the situation at a maximum positive speed is depicted. It shows how in this case the movable element has reached about 1000 rpm in the positive direction, while the auxiliary machine is now running at a speed of about 1200 rpm while the main generator remains working at 1200 rpm.

In reality the movable element will operate at speed ranges much lower than 1000 rpm as the waves only move slowly. Appropriate traditional gearing between the movable element and the power split transmission allows to increase the speed of the oscillatory movement, such a gearbox is shown in FIG. 11 as well. Such a configuration allows the main generator to operate at a speed significantly higher than the speed of the drum, leading to an increase in the conversion efficiency of the main electric generator. Moreover when the speed of the main electric generator is kept considerably constant by design, this speed can match the nominal design speed of the generator, resulting in a further increase of the conversion efficiency. Moreover, when keeping the speed of the main electric generator substantially constant the control algorithms implemented on the power electronics controlling this main generator can be of low complexity, i.e. a simple single quadrant power converter can be applied.

The drive train according to the present invention also comprises a control unit for controlling the auxiliary electrical machine, as is for instance shown in FIG. 11. To understand how the auxiliary electrical machine can be controlled to realise the advantages according to the present invention, we will first explain how the movements of the shafts in the drive train are coupled by referring to FIG. 7. The drive train comprising a power split transmission, on the input branch connected with the movable element and on the output branch connected with the main generator, can be modelled as a kinematic chain of rigid bodies, with two degrees of freedom. The relationship between the shaft speeds ($\omega_1$, $\omega_2$ and $\omega_3$) of each of the three ports, imposed by the power split transmission is:

$$\omega_1 + \omega_2 \cdot \omega_2 + k_3 \cdot w_3 = 0 \qquad (1)$$

Herein, the angular velocity of the first shaft equals $\omega_1$, in the case of a planetary gear box the gear ratios between the second and first resp. third and first shaft are $k_2$ and $k_3$. The gear ratio may for instance be determined from the number of teeth of each of the teethed gears (e.g. of the sun gear, ring gear and planet gear) in the power split transmission. In FIG. 7, the speed $\omega_1$ is the angular velocity of the shaft connected to the input branch of the drive train. In FIG. 7, the speed $\omega_2$ is the angular velocity of the shaft connected to the control port. In FIG. 7, the speed $\omega_3$ is the angular velocity of the shaft connected to the output branch of the drive train.

Furthermore, the external forces acting on all these bodies can be taken together to act as one single external moment or torque T on each of the corresponding rotating axes ($T_1$, $T_2$ and $T_3$). Equally, the inertia I from separate bodies can be taken together to form one equivalent inertial moment I for each of the corresponding shafts ($I_1$, $I_2$ and $I_3$). E.g. in the present example of FIG. 7, the hydrodynamic force operating on the movable element and the global inertia of the movable element itself can be expressed in a single moment operating on the first shaft of port 1 and a single inertial moment I present on the first shaft. Indeed, typically, the $T_1$, $T_2$ and $T_3$ will contain the contributions of respectively the hydrodynamic forces on the WEC and the torques applied by the auxiliary ($T_2$) and main electrical machine ($T_3$), as these are the only external forces acting onto the kinematic chain.

Supposing again that friction can be neglected, the following two independent equations of virtual power, corresponding to two independent virtual movements $\delta\omega^1$ and $\delta\omega^2$ of each of the three shafts, can be written for this kinematic chain ($\omega_1\_$dot is the time derivative of $\omega_1$, $\omega_2\_$dot is the time derivative of $\omega_2$, $\omega_3\_$dot is the time derivative of $\omega_3$):

$$(T_1-I_1\cdot\omega_{1\_dot})\cdot\delta\omega_1^1+(T_2-I_2\cdot\omega_{2\_dot})\cdot\delta\omega_2^1+(T_3-I_3\cdot\omega_{3\_dot})\cdot\delta\omega_3^1=0 \quad (2)$$

$$(T_1-I_1\cdot\omega_{1\_dot})\cdot\delta\omega_1^2+(T_2-I_2\cdot\omega_{2\_dot})\cdot\delta\omega_2^2+(T_3-I_3\cdot\omega_{3\_dot})\cdot\delta\omega_3^2=0 \quad (3)$$

The (independent) virtual motions for each of the three shafts ($\delta\omega^1$ and $\delta\omega^2$) can be deliberately chosen, as long as they fulfil the relationship between the shaft speeds, imposed by the power split transmission:

$\omega_1+k_2\cdot\omega_2+k_3\cdot\omega_3=0$ hence $\delta\omega_1^1+k_2\cdot\delta\omega_2^1+k_3\cdot\delta\omega_3^1=0$, and $\delta\omega_1^2+k_2\cdot\delta\omega_2^2+k_3\cdot\delta\omega_3^2=0$ In general, from the two equations of virtual power (2) and (3), at each moment in time, two variables can be calculated. If all properties of the kinematic chain are known and if the hydrodynamic interaction of the movable element with the wave(s)/fluid is established as functions of draft, velocity and acceleration, the application of a torque $T_2$ and $T_3$—respectively the torque through the main generator and the auxiliary motor/generator and the main generator—allows to calculate the acceleration $\omega_2\_$dot and $\omega_3\_$dot. The resulting acceleration $\omega_1\_$dot of the input shaft—and hence of the movable element itself—may also be readily calculated from equation (1). Given the $\omega_1\_$dot and the known hydrodynamic interaction of the movable element with the wave(s)/fluid as a function of draft, velocity and acceleration, the actual torque $T_1$—and hence the external forces acting on the movable element and WEC—may be calculated.

Now with the above tools, an example of a simple control strategy applied to a possible embodiment of the present invention is described hereunder. The example is explained for the simplified case of sinusoidal wave (known) motions in regime. For unknown and irregular waves the motion of the waves may be predicted based on any suitable algorithm, additional sensors, . . . .

In regime, and according to embodiments of the present invention, the main electric generator preferably works close to its nominal speed. Depending on the total inertia on the main electric generator shaft, more or less acceleration/deceleration ($\omega_3\_$dot) will occur during one period of the oscillatory movement. Hence, for a given generator control strategy, the torque $T_3$ is predetermined or $\omega_3\_$dot is predetermined.

At the same time, for a given sea state, it can be estimated or predicted at each moment in time (with known draft and velocity) given the hydrodynamic characteristics of the movable element, which acceleration and associated torque profile need to be applied on the input branch in order to guarantee maximum wave energy extraction. Hence, the ideal torque $T_1$ to be applied on the input shaft may be known in advance, and it will thus be up to the control unit of the auxiliary electrical machine to apply the needed torque $T_2$ (or acceleration, $\omega_2\_$dot), to guarantee optimal WEC movement and hence wave power extraction. The torque $T_1$ to be applied on the input shaft to extract maximum power from the waves can for instance be determined with methods described in "Modelling of hydraulic performance and wave energy extraction by a point absorber in heave", 28 Sep. 2004, Vantorre et al., which is incorporated herein by reference. The movement of the kinematic chain shall hence result in a one-way rotation of the main generator, preferably in a range close to its nominal speed and preferably being substantially constant. Thereto, at certain intermediate moments of the oscillatory movement during one period of the oscillatory movement, the auxiliary electrical machine may need to inject power into the drive train, while during other periods the auxiliary electrical machine may need to extract power from the drive train. Hence, the auxiliary machine will need to be able to operate both as a generator and a motor. As such the auxiliary machine actively controls over the period of the oscillatory movement the power flow from the movable element to the main generator. Yet, controlling may still result in the combined requirements on the shaft connected to the auxiliary electrical machine (through $T_2$) and the shaft connected to the main generator (through $T_3$). A well thought of design of the drive chain (e.g. by adding a rotational inertia on shaft 3, in order to store excess extracted power and limit momentary speed variation) allows to realise these requirements more easily; i.e. with an auxiliary machine with a lower rated power or a main generator with a simpler control strategy or less speed variations in the speed/torque of the main generator.

Figure 12:
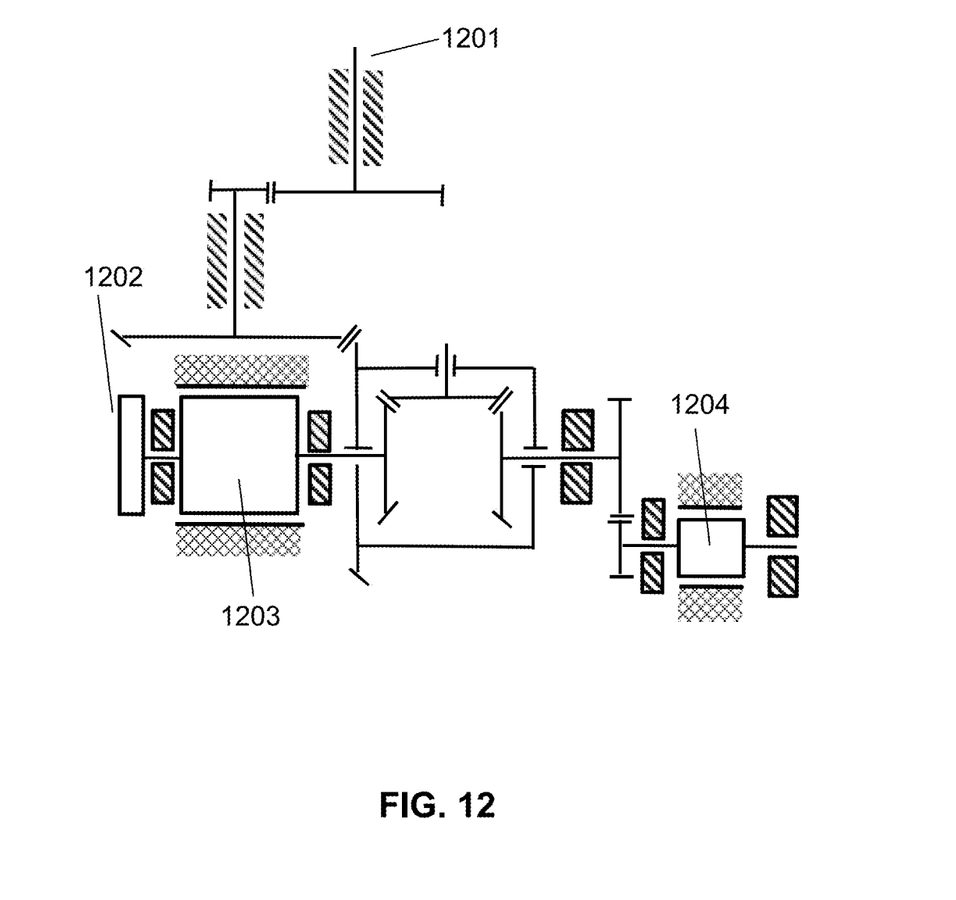
FIG. 12 shows a more detailed implementation of a device according to an embodiment of the present invention comprising a power split transmission, whereby in this case a differential is used.
Figure 13:
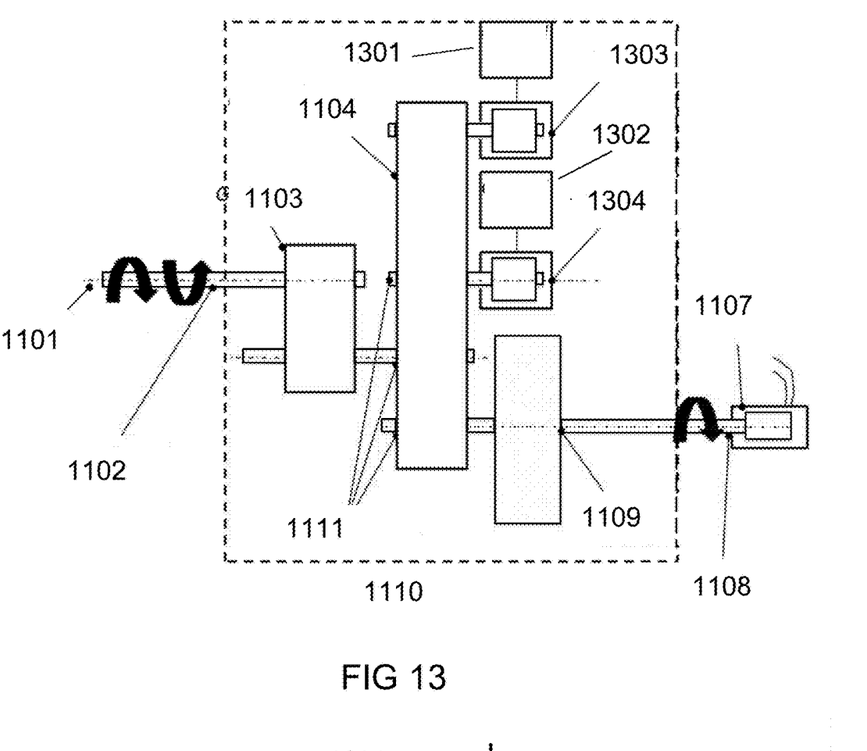
FIG. 13 shows a device according to an embodiment of the present invention comprising a power split transmission with one input port, one output port and two control ports.
Figure 15:
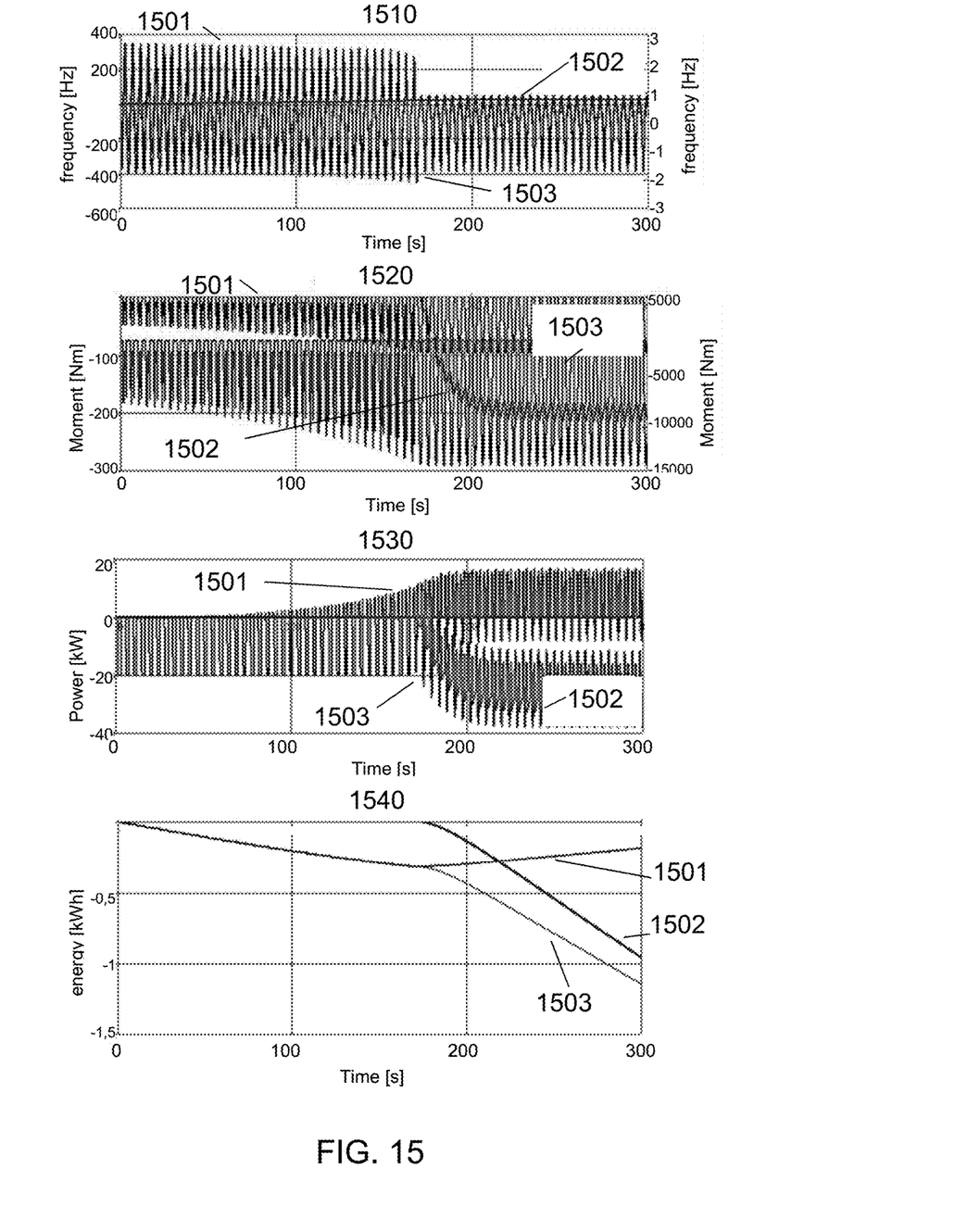
FIG. 15 shows some results of the operation of device 12, more particularly it shows the speed of the axis at the input, control and output port; resp. the torque on each of the axis; resp. the power extracted/injected at the control and output port; resp. the energy used/produced at each of the ports.

Using the system of FIG. 12 a simulation was done for a buoy with a cable connected to the sea bed, the cable connected to a drum (corresponding to the movable element), corresponding to FIG. 1. The buoy consists of a floater of 3 m height, 5 m diameter, a mass of 25 ton and a volume of 60 m³. The incoming waves were assumed to be known and corresponding to a sea-state 3. In line with the above method first the torque required to get the maximum power output from the waves was determined. Due to the cable the transferred torque can only be positive (i.e. pulling the buoy in the water, it cannot be pushed upwards). Due to a fixed ratio of the torques of the input, output and control shafts, the required torque at the moveable element should be controlled by the torque realised at the control port. In short, when the buoy moves downwards the torque is zero, when the buoy moves upwards the required torque is generated by the auxiliary machine (assume this corresponds to a negative torque). At the same time this torque realised at the control port creates a negative torque at the output port. The power which is extracted as such from the moveable element is split to the control port and the output port. When initially, no power is extracted at the generator this power at the output port is used to speed up the flywheel. This is shown in FIG. 15 whereby the speed of the main generator increases. During this first period, no power is extracted, nor delivered by the auxiliary generator during downward movements, during upward movement there is a net power generation by the auxiliary generator. After this first period, power is extracted at the main generator as can be seen by the fact that the torque is settling to a fixed negative value (with some remaining fluctuation). During this period, during the upward movement power is extracted from the movable element to speed up the flywheel and to generate power by the main generator; during the downward movement power is generated by the main generator by extracting some mechanical power stored in the flywheel. The rated power of this main generator can be in the order of 40 kW, and a very low complexity main generator can be used. Furthermore, it can be observed that the power levels at the auxiliary generator are in the order of 20 kW, more importantly it is noticed that the power changes sign meaning the auxiliary machine both works as a generator and as a motor. As the torque is always negative, it means that the speed changes sign, hence a variable speed auxiliary electrical machine is required. The total output power is in the order of 25 kW. It can be shown that the same output power can be realised by a direct connection between the movable element and a main generator and according power electronics which would require a rated power of 100 kW, while now two machines and two power electronics with a lower rated power are required.

Figure 14:
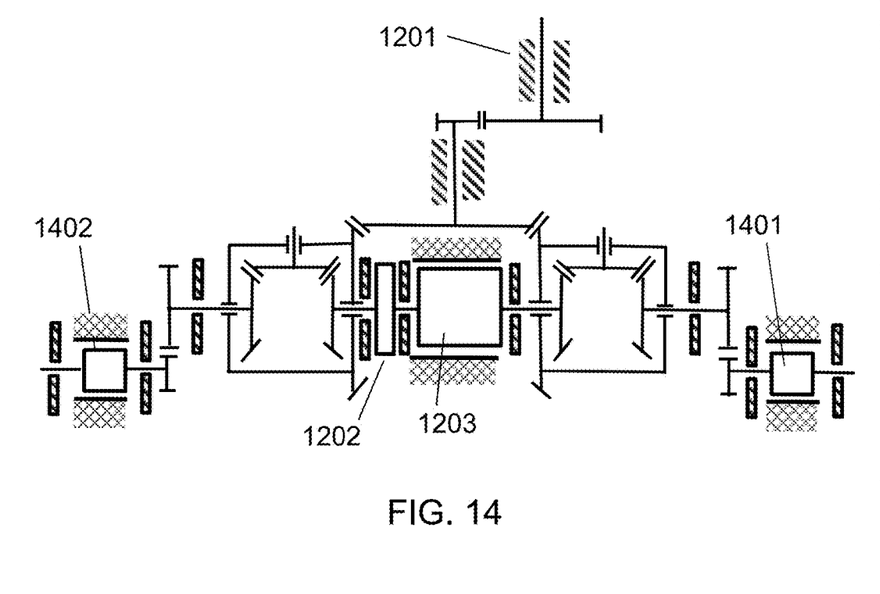
FIG. 14 shows a device according to an embodiment of the present invention comprising a power split transmission with one input port, one output port and two control ports and whereby the power split transmission is implemented by using the combination of two differentials.

Using the system of FIG. 14 a simulation was done for a buoy with a rack and pinion system as e.g. corresponding to the system of FIG. 2, the buoy again consists of a floater of 3 m height, 5 m diameter, a mass of 25 ton and a volume of 60 m$^3$. The incoming waves were assumed to be known and corresponding to a sea-state 3. In line with the above method first the torque required to get the maximum power output from the waves was determined. This time both positive and negative torques can be transferred to the buoy. However, if we would provide a negative torque at the control it would result in a negative torque at the output port as well, which will in regime cause the main generator to change direction all the time. Hence, an additional control port is required. This is realised in the system of FIG. 14, comprising two differentials whereby there is a fixed coupling between the right and left axle of the two differentials, to this coupled axles the main generator and flywheel are connected. This allows not only to impose a negative torque at the level of the movable element while still imposing a positive torque at the main generator. In such a system the two control ports work in an alternating way, whereby negative torque is imposed by control port 1 while positive torque is imposed by control port 2.

With reference to FIG. 12, it might thus be required to operate the auxiliary electrical machine in operating conditions which are much further away from the optimal, in terms of efficiency and operating points. It is however an advantage of the invention that the auxiliary machine can be of lower power compared to the main generator as such losses in this machine are of less importance compared to losses in the main generator. E.g. in an extreme case assume the main generator has a rated power of 100 kW and the auxiliary machine has a rated power of 1 kW, then even a difference in efficiency of the auxiliary machine of 10% vs. 90% only leads to a difference in overall efficiency of about 0.8%. In the example above two cases are compared: (1) transforming on average 25 kW of wave energy with a single machine of 100 kW and (2) transforming 25 kW of wave energy with a main generator of 40 kW and an auxiliary electrical machine of 20 kW. In the first case the 100 kW machine will have a very low average efficiency due to the fact that it will constantly change direction and speed. Assuming e.g. 50% only 12.5 kW of electrical power of the 25 kW will actually be generated. In the second case, for the main generator of 40 kW a highly efficient generator can be selected and due to the uni-directional movement the generator can work in optimal conditions leading to efficiencies of e.g. 90%. Hence, of the 25 kW 22.5 kW of electrical power will be generated. It should still be understood that additional losses will occur in the auxiliary electrical machine of 20 kW leading to a lower net output power. However, at an assumed average load of ¼ of the rated power (same as the main generator in case 1) and an assumed efficiency of 50% (the same assumption as for case 1) this would lead to an additional loss of about 3 kW and a net output power of 19.5 kW. Hence, the overall efficiency of the proposed system (with a net output power of 19.5 kW) will be higher than the conventional one (with a net output power of 12.5 kW).

It should be noted that more advanced control strategies can be implemented, all with the common characteristic of realizing a unidirectional movement of the main generator while further optimizing the behaviour of the wave energy converter. As such special control strategies that take into account measurements of the behaviour of the converter, the wave motions, statistical or stochastical analysis of different parameters, . . . can be implemented to further improve the operation of the converter.

It should be noted that the drive train can further include additional components in order to further improve its design and/or operation. As such the mechanical oscillatory movement of the drum of FIG. 1 connected to the movable element could first be converted into an oscillatory movement of a mechanical shaft by means of a gearbox, belt transmission, or any other type of transmission in order to change the speed and torque of the mechanical shaft connected to the input shaft. This transmission ratio might be variable with discrete steps, whereby the several steps are selected depending on the wave climate the WEC is designed for. The gear ratio is then used to adapt the natural frequency as to fit the wave frequency. The natural frequency of the WEC is defined by the frequency at which the WEC shows a maximum amplitude of movement response when triggered by wave excitations. The natural frequency is determined by many design parameters a.o. the shape and weight of the WEC and the inertia on the mechanical shaft, . . . .

Moreover, the steps in the transmission ratio could be changed during operation to adapt the WEC to the momentary occurring sea state conditions, as such fine tuning the natural frequency of the WEC to the wave frequency. More advanced transmission systems such as a continuous variable transmission can be used to allow for further tuning of the natural frequency of the WEC to the wave frequency. Doing so, the power in the oscillatory movement can be maximized.

The drive train could also include flywheels on any of the three shafts directly or indirectly connected to the input, output and control ports. Such flywheels can be used to change the inertia of the WEC and to ensure the natural frequency is adapted to the wave climate the WEC is designed for. Moreover, one could opt to allow the inertia of the flywheels to be tunable either in a discrete or continuous way. This would further allow to tune the natural frequency of the WEC to the momentary sea state conditions occurring. Doing so, the power in the oscillatory movement can be maximized.

The flywheels, could also be used to damp variations in speed at the main generator. Furthermore, flywheels could be used to mechanically store energy on one of the shafts. The latter is of importance e.g. for the shaft with the main generator. Adequate design of the flywheel(s) allows to reduce the required rated power of the auxiliary generator, as the flywheel can be used to add inertia to the main generator as such limiting its speed variations.

The drive train could also include other means for temporally storing energy, such as short term electrical storage means or hydraulic storage buffers, the storage means assisting the auxiliary generator in adequately controlling the torque and speed on the output shaft to ensure that the torque-speed conditions of the main generator are close the most optimal operating conditions.

The drive train finally could include one or more freewheels, anti-reverse systems or clutches on one of the shafts. Though it is an explicit objective of this invention not to use freewheels, anti-reverse systems or clutches for converting and inverting the oscillatory movement into a unidirectional movement, the use of any of such components might proof to be interesting for realising other desirable functions of the drive train, e.g. a clutch could be used to disengage the drive train from the drum in case of wave storm conditions and to prevent overloading.

It will be understood by those skilled in the art that the same objective or creating a unidirectional movement on an output shaft induced by an oscillatory movement on an input shaft can be realised as well by other configurations: sun gear connected to the shaft with the oscillatory movement, ring gear connected to the main generator and planet gear connected to the auxiliary generator. It is clear that the best design depends on the gear ratios, required speed and torque levels or limits, . . . .

It will be understood that similar oscillatory movements and conditions occur in other types of WECs.

It will be understood by those skilled in the art that, though a simple single quadrant power converter can be applied for the main generator, there might be other reasons for choosing a more advanced four-quadrant power converter. Such reasons might include the need to realize start-stop cycles, to perform frequency or voltage control of the grid connected generator. During start-up behaviour the main generator will act as a motor.

It will be appreciated by those skilled in the art that though the principle of operation was described using a specific type of point absorber, similar oscillatory movements can be obtained using other types of point absorbers or other types of wave energy converters.

REFERENCE NUMBERS

101—Wet part
102—Drum
103—Dry Part
104—grid
105—Power Electr (PE)
106—Generator
107—Guiding
108—Anchorage
109—Seabed
601—ports
602—Left Axle
603—Differential
604—Ring Gear
605—Right Axle
606—Pinion Gear
701—ports
1101—Movable element
1102—Input branch
1103—Gear box
1104—power sharing transmission
1105—Control unit
1106—Auxiliary electrical machine
1107—Main generator
1108—output branch
1109—rotational inertia
1110—Drive train
1111—Ports of the PST
1201—input
1202—flywheel
1203—generator
1204—controller
1301—control unit 1
1302—control unit 2
1303—auxiliary electrical machine 1
1304—auxiliary electrical machine 2
1401—controller 1
1402—controller 2
1501—generator 3
1502—generator 4
1503—total
1510—Mechanical frequency
1520—moment
1530—power
1540—converted energy

The invention claimed is:

1. A device for generating electric energy from a wave motion, the device comprising a movable element movable under the influence of the wave motion, a main electric generator, a drive train comprising an input branch and an output branch, the drive train being arranged between the movable element and the main electric generator, the movable element imposing an oscillatory movement on the input branch of the drive train as a result of the wave motion, the oscillatory movement being a periodic movement, having a period wherein during alternating moments in time positive and negative speeds are imposed to the input branch, the drive train comprising a power split transmission comprising at least three ports, the at least three ports comprising at least one input port connected to the input branch, at least one output port connected to the output branch and at least one control port, the power split transmission being arranged for distributing power received on the input port to the at least one output port and the at least one control port, wherein the drive train furthermore comprises a variable speed auxiliary electrical machine and a control unit for controlling the auxiliary electrical machine, the at least one control port of the power split transmission being connected to the auxiliary electrical machine and the control unit being configured for controlling power distribution in the power split transmission as to realize a one-way rotation of the main electric generator during the whole period of the oscillatory movement.

2. A device according to claim 1, wherein the control unit is configured for controlling power distribution of a positive power flow from the moveable element to the drive train in one part of a period of the oscillatory movement and of a negative power flow from the moveable element to the drive train in another part of the period of the oscillatory movement.

3. A device according to claim 2, wherein said control unit is configured for controlling an auxiliary torque or an auxiliary acceleration of the auxiliary electrical machine for controlling power distribution to and from any of the at least three ports of the power split transmission.

4. A device according to claim 3, wherein said control unit is configured for performing said power distribution to and from any of the at least three ports of the power split transmission so as to shift the moments in time of imposing positive and negative speeds at the input branch with respect to the moments in time when positive or negative power flow from the movable element to the drive train occurs.

5. A device according to claim 1, wherein the control unit is configured for realising a predetermined torque of the movable element as to generate the maximum amount of energy during the period of the oscillatory movement.

6. A device according to claim 1, wherein the power split transmission comprises at least one planetary gear box comprising a sun gear, a ring gear and a planet gear.

7. A device according to claim 1, wherein the power split transmission comprises at least one differential unit.

8. A device according to claim 1, wherein the output branch comprises at least a mechanical energy storage device adapted for storing at some moments in time mechanical power and for providing at certain moments in time mechanical power to the main generator.

9. A device according to claim 8, wherein the mechanical energy storage device is a flywheel.

10. A device according to claim 1, wherein the at least three ports of the power split transmission consist of one input, one output and one control port and whereby the control unit is configured for extracting power from the movable element during movement of this element in one direction.

11. A device according to claim 1, wherein the at least three ports of the power split transmission comprise at least one input port, at least one output port and at least two control ports and wherein the control unit is configured for extracting power from the movable element during movement of this element in a substantially upward and a substantially downward direction.

12. A method for generating electric energy from a wave motion, the method comprising
providing interaction between a wave motion and a movable element, the moveable element thus imposing an oscillatory movement being a periodic movement to an input branch of a power split transmission, the periodic movement having a period wherein during alternating moments in time positive and negative speeds are imposed to the input branch,
controlling a power distribution in a power split transmission arranged between the movable element and a main electric generator so as to realize a one-way rotation of a main electric generator, said controlling a power distribution comprising controlling a variable speed auxiliary electrical machine connected to the power split transmission.

* * * * *